(12) United States Patent
Binding et al.

(10) Patent No.: US 7,676,742 B2
(45) Date of Patent: Mar. 9, 2010

(54) SYSTEM AND METHOD FOR PROCESSING OF MARKUP LANGUAGE INFORMATION

(75) Inventors: Carl Binding, Rueschlikon (CH); Reto Hermann, Buttikon (CH); Andreas Schade, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 10/893,692

(22) Filed: Jul. 17, 2004

(65) Prior Publication Data

US 2005/0114762 A1    May 26, 2005

(30) Foreign Application Priority Data

Nov. 24, 2003    (EP) ................. 03405836

(51) Int. Cl.
*G06F 17/00* (2006.01)

(52) U.S. Cl. ............. 715/242; 715/201; 715/234; 715/237

(58) Field of Classification Search ............ 715/500.1, 715/513, 514, 201, 234, 237, 242
See application file for complete search history.

(56) References Cited

U.S. PATENT DOCUMENTS

| | | | |
|---|---|---|---|
| 6,311,223 B1 * | 10/2001 | Bodin et al. ............... 709/247 |
| 6,635,088 B1 * | 10/2003 | Hind et al. ................ 715/513 |
| 7,007,105 B1 * | 2/2006 | Sullivan et al. ........... 709/247 |
| 7,043,686 B1 * | 5/2006 | Maruyama et al. ......... 715/513 |
| 2003/0005001 A1 * | 1/2003 | Kataoka ................... 707/513 |
| 2004/0143791 A1 * | 7/2004 | Ito et al. .................. 715/513 |

FOREIGN PATENT DOCUMENTS

EP    1122655 A2 *    8/2001

OTHER PUBLICATIONS

Morin, How to Base64, 2002, <http://www.kbcafe.com/articles/HowTo.Base64.pdf>, pp. 1-9.*
XER, XER(XML Encoding Rules) Concept, Oct. 14, 2003, <http://web.archive.org/web/20031014134312/http://asf.gils.net/xer/concept.html>, pp. 1-2.*

* cited by examiner

*Primary Examiner*—Stephen S Hong
*Assistant Examiner*—David Faber
(74) *Attorney, Agent, or Firm*—Ido Tuchman; Mark Wardas

(57) ABSTRACT

A system and method for processing of markup language information, such as extensible markup language (XML) based control information is disclosed. The system comprises a compression sender entity and a decompression receiver entity. The sender entity uses its internal, binary representation derived from textual XML-based protocol header and encodes the binary representation as a tag-length-value (TLV) binary value. The TLV binary value is embedded as encoded data in a specifically marked comment, which may be detected by the receiver entity. The receiver entity builds up an internal, binary data structure based on the encoded data representing the original XML data. The system avoids the usage of string data to represent a small set of well known strings and uses a more compact binary encoding which reduces space and time to process the data.

18 Claims, 3 Drawing Sheets

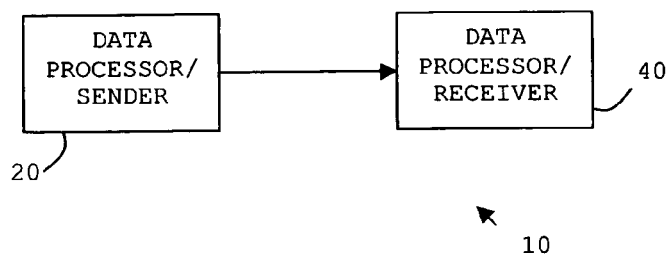
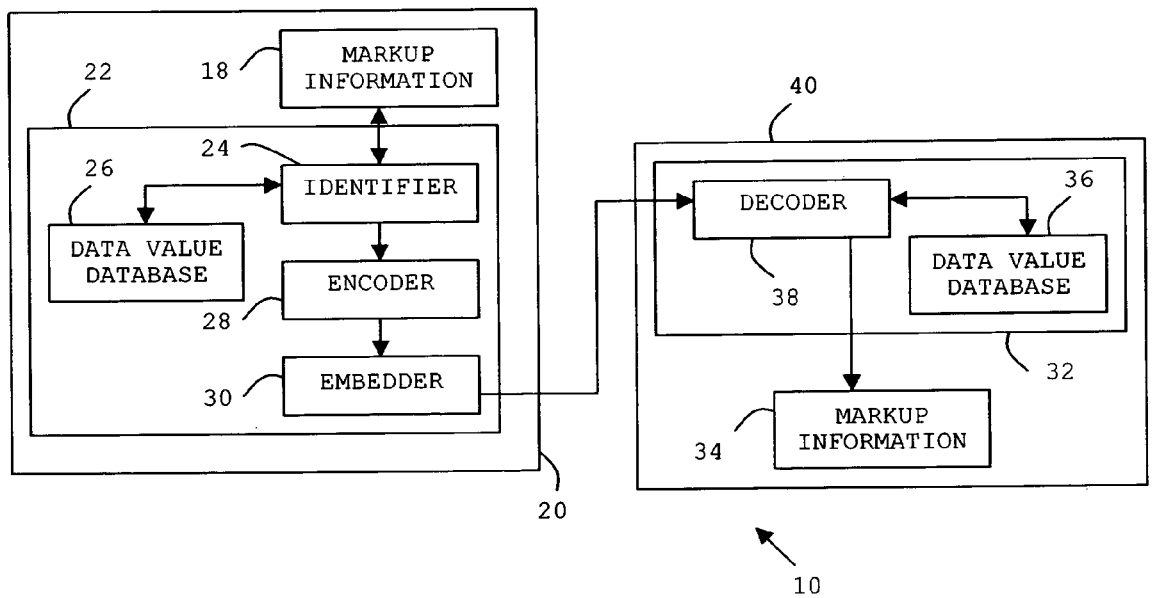

SYSTEM AND METHOD FOR PROCESSING OF MARKUP LANGUAGE INFORMATION

CROSS-REFERENCE TO RELATED APPLICATIONS

This application claims priority under 35 U.S.C. § 119 to European Patent Application No. 03405836.2 filed Nov. 24, 2003, the entire text of which is specifically incorporated by reference herein.

FIELD OF THE INVENTION

This invention relates to processing of markup language information, and particularly (though not exclusively) to processing of extensible markup language (XML).

BACKGROUND

Extensible markup language (XML) is a formalism to mark up text-based data with additional information to convey graphical layout information, semantic tags etc. XML allows elements to be specified and allows the nesting of such elements through the use of so-called document type definitions (DTD). Thus it is possible to describe a large variety of data using XML syntax. Partly as a consequence, XML and XML based DTDs have found wide-spread interest in the technical community, in particular for activities within the world wide web consortium (W3C) and the wireless application forum (WAP) where XML is used to specify data exchanged between at least two computing entities.

In addition to the DTD mechanism, the W3C has more recently been promoting XML Schema—a schema describing formalism for XML data. In addition to describing the data's element and attribute structure—akin to DTDs—XML Schema allows to constrain the textual data elements themselves, which may only be unconstrained strings when using DTDs.

One of the problems of XML based data, described by either DTDs or XML Schemas, is its verbosity. All data is textual in nature and thus has a low information density. For example, tags and attribute names represent elements of a finite, small vocabulary for which a plain text representation is inefficient. Moreover, the processing of textual XML data is space and time consuming.

Processing time may be attributed to two activities: 1) recognizing and verifying the structure of the data (i.e. parsing); and 2) interpreting of the individual data values. For instance, to encode a colour set of (red, blue, green) a computing entity would have to handle the strings "red", "blue", or "green" rather than manipulating a 2-bit binary value. Additionally, string operations are of linear complexity for comparison and searches of patterns within a string.

From U.S. Pat. No. 6,311,223, granted 30 Oct. 2001 to Boden et al., there is known a system involving compression of a markup language, particularly, hypertext markup language (HTML) by tokenization of tags and removal of comments.

Compression techniques for XML based data have been proposed and may be based on well-known string compression algorithms. An XML-specific proposal, known as wireless binary XML (WBXML), Wireless Application Protocol Binary XML Content Format Specification, Version 1.1, 16 Jun. 1999, WAP Forum, is based on tokenizing well-known strings present in the XML data and detecting repetition of multiply occurring strings within the data which are then grouped in a string lookup table. Whilst the mechanism of WBXML is efficient, not all the protocols based on XML DTDs also provide a WBXML encoding table, needed for the WBXML compression.

Other compression string compression algorithms are known, particularly Lempel-Ziv encoding, J. Ziv and A. Lempel, "A Universal Algorithm for Sequential Data Compression", IEEE Transactions on Information Theory, Vol. 23, pp. 337-342, 1977, and Huffmann encoding, Huffmann, D, "A Method for the Construction of Minimum Redundancy Codes", Proc. IRE, vol. 40, pp. 1098-1101, September 1952. Of the above two string compression algorithms, Huffmann encoding provides the densest achievable compaction. However, Huffmann encoding requires a statistical analysis of the input data before the compression takes place. Furthermore both entities exchanging data items must agree in advance on the chosen, data dependent, encoding to exchange Huffmann-encoded data.

Whilst much XML data represents free-form data containing arbitrary values, some protocols use XML data to encode data which may only take a limited set of values. For example, the WAP forum-defined "push access protocol" (PAP), Wireless Application Protocol, Push Access Protocol Specification, November 1999, WAP Forum, uses an XML DTD to specify the protocol headers. More particularly, it is possible to associate a quality-of-service element with a push-message where the quality-of-service fields are represented as name-value pairs with both names and values represented as strings. Given the limited number of options for most values as well as the a priori set of known attribute names, such encoding is sub-optimal from an information theoretic point of view.

However the approaches, as described above, have disadvantages. For example, WBXML compression is not suitable for protocols based on XML DTDs that do not provide a WBXML encoding table since the encoding tables must be disseminated before communicating entities may exchange compressed XML. The densest achievable compaction for Huffmann encoding is limited by statistical analysis of the input data which is required before the compression takes place. Plain, textual XML representation of PAP protocol entities is sub-optimal from an information theoretic point of view since PAP protocol requires a set of textual strings to encode values from an often small and predefined value set.

A need therefore exists for a scheme for processing of markup language information wherein the above mentioned disadvantages may be alleviated.

SUMMARY OF THE INVENTION

One aspect of the invention is a system for processing of markup language information. The system includes a first data processor and second data processor. The first data processor is configured to receive markup language information, identify at least a part thereof for compression, and assign a label representative of the part to form compressed information representative of the mark up language information comprising the label. The a second data processor, in communication with the first data processor, is configured to receive the compressed information from the first data processor, decompress the information, identify the label and associate the label with the part of markup language information.

Another aspect of the invention is a method for processing of markup language information comprising. A receiving operation receives markup language information at a first data processor for identifying at least a part of the markup language information for compression. An assigning operation assigns a label representative of the part to form compressed information representative of the mark up language information comprising the label. A sending operation sends the compressed information to a second data processor in communication with the first data processor. A decompressing operation decompresses the compressed information in the second data processor. An identifying operation identifies the label, and an associating operation associates the label with the part of markup language information.

A further aspect of the invention is computer program product for processing of markup language information in computer program logic on the processor of a computer. The computer program product includes computer readable program codes for receiving markup language information at a first data processor for identifying at least a part of the markup language information for compression, assigning a label representative of the part to form compressed information representative of the mark up language information comprising the label, sending the compressed information to a second data processor in communication with the first data processor, decompressing the compressed information in the second data processor, identifying the label, and associating the label with the part of markup language information.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 1 shows a system for processing of markup language information in accordance with an embodiment of the invention.

FIG. 2 shows the system of FIG. 1 in more detail in accordance with an embodiment of the invention.

DETAILED DESCRIPTION OF THE INVENTION

Figure 3A:
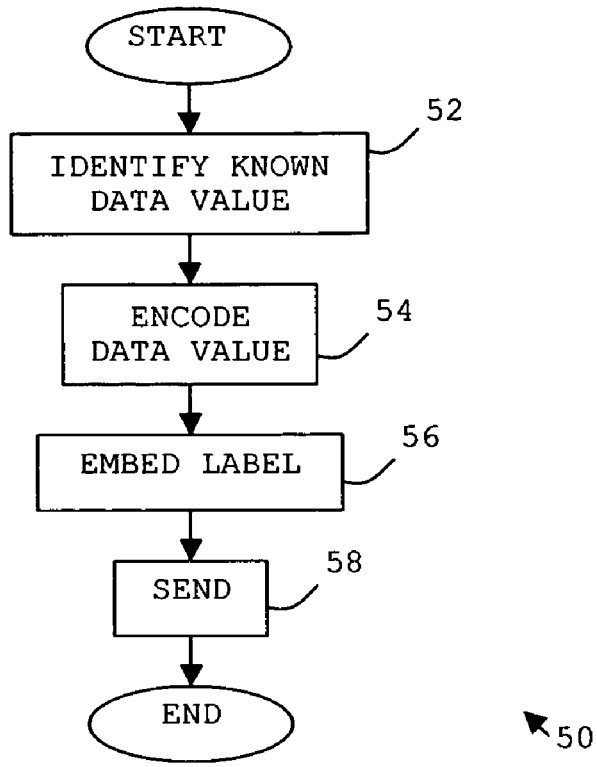
FIGS. 3A and 3B show a method for processing of markup language information in accordance with an embodiment of the invention.

An embodiment of a system of the invention is shown in FIGS. 1 and 2. FIG. 1 shows the system 10 having a first data processor 20 that sends compressed markup language information to a second data processor 40. The markup language information may be in a markup language such as extensible markup language (XML), however, the invention may be embodied in any systems where textual data is mapped onto binary data. With this configuration, mapping from memory resident, binary encoding into external, textual encoding and back into memory resident binary encoding is avoided.

The system is to encode structured XML data containing combinations of a priori well-known data values as binary data, encode the binary data as textual string data, and embed the binary data in a specifically marked comment field. FIG. 2 shows the system of FIG. 1 in greater detail.

FIG. 2 shows the first data processor having a data compressor 22 and a source 18 for providing or receiving markup information. The data compressor 22 comprises an identifier 24 for identifying a part of the markup language information 18 to compress and assign a label from a data value database 26. An encoder in communication with the identifier 24 encodes the markup information, and an embedder 30 embeds the label in the compressed information. The compressed information is sent from the first data processor 20 and received by the second data processor 40 for decompressing the compressed data. A data decompressor 32 in the second data processor 40 comprises a decoder 38 for decoding the encoded compressed information, and identifying the label and associated part of markup language information, which is stored in a data value database 36. Of course, the databases 26, 36 may also be configured to be the same database, accessible by both the first and second data processors. The compressed information is decompressed to markup language information 34.

Figure 3B:
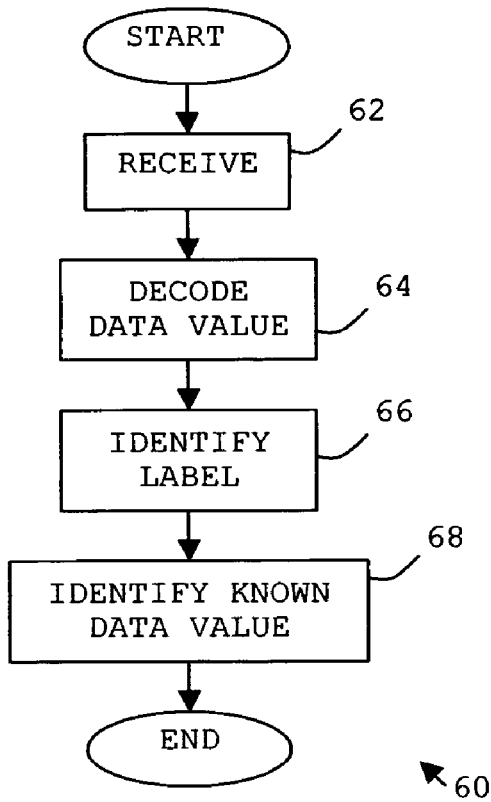

With reference to FIGS. 3A and 3B, a method of processing of markup language information is shown for the sending entity 50 and the receiving entity 60, respectively. A sender entity such as the data processing entity 20 may use the sender entity's or data processor's internal binary representation derived and identified 52 from textual XML-based protocol header and encode 54 the binary representation as a tag/type-length-value (TLV) binary value. The sender entity internally generally uses such a binary representation, and externally, textual XML data is used to exchange information between computing entities and to maintain backward compatibility. The binary value is embedded as encoded data such as base64-encoded data or the like in a specifically marked comment field, which may be detected by the receiver entity such as second data processor 40. The data receiver builds up an internal, binary data structure based on the base64-encoded data representing the original XML data. The system may use TLV based data representation as a label, the information/data may be binary data, and may be encoded as base64 encoding or any other encoding compatible with the character set used in the markup language information. For an XML document, base64 encoding is compatible. After encoding, then the next step is to embed 56 the created string, for example in an XML comment field, preceding with a uniquely identifiable label representing the XML tag of the data. Such an example is:

<!--_% TLV_HDR %_ . . . -->

The information is then sent 58.

When the receiving entity such as second data processor 40 receives 62 XML data from the sending entity containing such an embedded comment, the receiving entity has for example options such as: 1) process the XML data as usual, i.e., treat the comment field as comment and ignore the compressed information; or 2) detect 66, 68 the base64-encoded TLV header contained in the specifically marked comments, and decode 64 the compressed information.

Due to the compact data representation, avoiding strings in many cases, the processing of the TLV is more efficient. Although still of linear complexity, the interpretation of string data values with the associated scanning and string operations is avoided. In addition the overall data volume representing the header is reduced.

As an example, values to represent one of a set of colours may be represented in a protocol control header. The range of colours may be: red, blue, green, pink, yellow, orange, turquoise. Thus, seven colours require no more than 3 bits for coding. In addition, a unique tag must precede the data to denote that the type is "colour". Assuming octet-sized tags (8 bits) and that the data is octet aligned, 16 bits may be required to exchange the data.

A further compaction may be achieved if the structure of the header is known in advance. In this case the second data processor 40 may interpret the data based on its position, a preceding tag identifying the data type may be omitted. However, in this case the data is position-sensitive and sender and receiver must agree in advance not only on the data encoding but also on the data structure. In this case, only one octet is required. An example of this configuration is:

Plain textual XML representation:

```
<record>
    <field1>green</field1>
    <field2>high</field2>
</record>
```

Textual XML encoding with embedded tokenized tags and data:

```
<record>
    <field1>green</field1>
    <field2>high</field2>
</record>
<!--0102050003060000 -->
```

Textual XML encoding with data only (without tokenized tags):

```
<record>
    <field1>green</field1>
    <field2>high</field2>
</record>
<!--0506 -->
```

In the above, the plain textual XML representation is first listed. Listed next is textual XML encoding with embedded tokenized tags and data with the added binary encoded XML, using value 01 to encode the <record> tag, 02 to encode the <field1> tag, 03 for <field2>, and 00 for end-tag. In the next example textual XML encoding with data only (without tokenized tags) is listed where the tag fields are omitted and only the data values to represent "green" and "high" respectively (namely 05 and 06 ) remain.

Figure 4A:
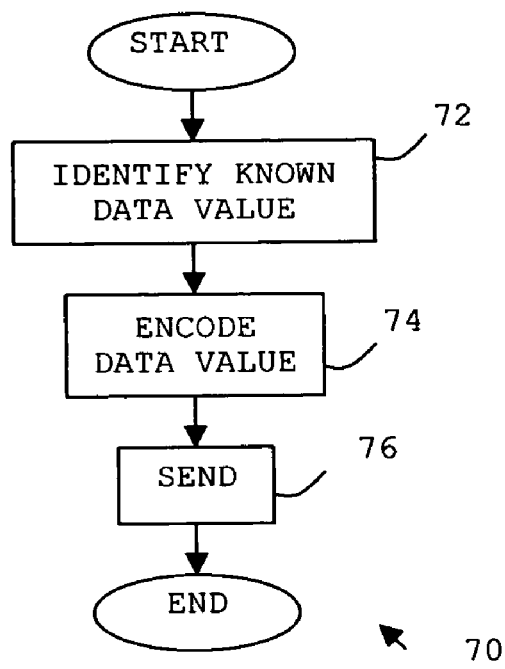
FIGS. 4A and 4B show a method for processing of markup language information in accordance with another embodiment of the invention in which redundant tagging of information is avoided.
Figure 4B:
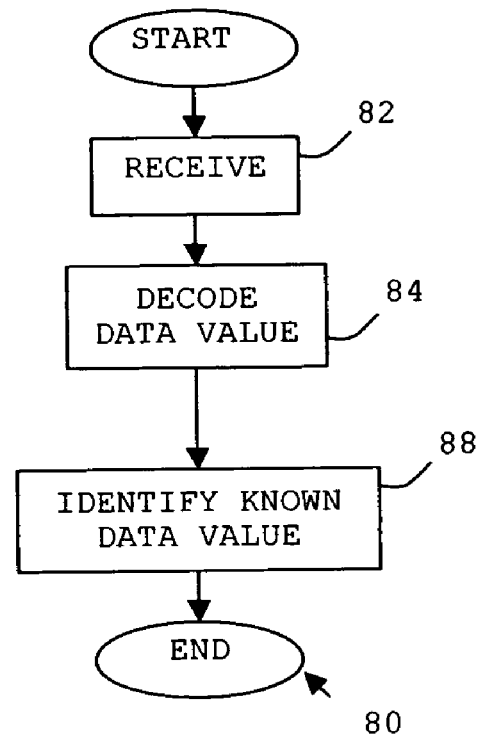

FIGS. 4A and 4B represent the processing flow of this embodiment. A method of processing of markup language information is shown for the sending entity 70 and the receiving entity 80, respectively. A sender entity such as data processing entity 20 may use the sender entity's or data processor's internal binary representation derived and identified 72 from textual XML-based protocol header and encode 74 the binary representation as a tag/type-length-value (TLV) binary value. The sender entity internally generally uses such a binary representation, and externally, textual XML data is only used to exchange information between computing entities and maintain backward compatibility. The binary value is embedded as base64-encoded data in a specifically marked comment field, which may be detected by the receiver entity such as second data processor 40. The encoded data value is directly embedded in a specially marked up XML comment without prepending with additional XML tag information. Additionally, the positional information determines the decoding operation binding. An example of this is:

```
<!--13 % TLV_HDR %_ . . . -->
```

When the sending entity sends 76 and the receiving entity such as second data processor 40 receives 82 XML data containing such an embedded comment, the receiving entity may have the following options: 1) process the XML data as usual, i.e., treat the comment field as comment and ignore the compressed information; or 2) detect 88 the base64-encoded TLV header contained in the specifically marked comments, and decode 84 the compressed information. Decoding of the received data value 84 is based on the position of said data value in the encoded, sent data 74,76. Besides the more compact data encoding, processing of the data is sped up as the second data processor 40 may branch based on a binary number representing the color and may not perform any string comparison operations.

It will be appreciated that the scheme for XML processing described above may typically be carried out in software running on processors (not shown) at sender and receiver entities, and that the software may be provided as computer program elements carried on any suitable data carriers (also not shown) such as magnetic or optical computer discs.

It will be understood that the system, arrangement and method for processing of XML information described above provides advantages such as avoiding the usage of string data to represent a small set of well known strings, and use a more compact binary encoding which reduces space and time to process that data. It will be appreciated that specific embodiments of the invention are discussed for illustrative purposes, and various modifications may be made without departing from the scope of the invention as defined by the appended claims.

The invention claimed is:

1. A system for processing of markup language information, the system comprising:
   a first computer including a first data processor for receiving markup language information, identifying a part thereof for compression, assigning a label representative of the part to form compressed information representative of the mark up language information comprising the label; and
   a second computer including a second data processor, in communication with the first data processor, for receiving the compressed information from the first data processor, decompressing the information, identifying the label and associating the label with the part of markup language information.

2. A system of claim 1 wherein the first data processor comprises a compressor comprising:
   an identifier for identifying the part of the markup language information for compression and assigning the label;
   an encoder for encoding the markup language information into compressed information; and
   an embedder for embedding the label in the compressed information.

3. A system of claim 1 wherein the first data processor further comprising a data value database for storing the label representative of a predetermined part of markup language information.

4. A system of claim 3 wherein the second data processor further comprises a data value database for storing the label representative of a predetermined part of markup language information.

5. A system of claim 4 wherein the data value database is accessible by the second data processor.

6. A system of claim 1 wherein the markup language information is extensible markup language (XML).

7. A system of claim 1 wherein the label is binary data.

8. A system of claim 1 wherein the label is a tag-length-value based data representation.

9. A system of claim 1 wherein the compressed information is textual string data, and the label is embedded in a header comment field of the textual string data.

10. A system of claim 1 wherein the compressed data is base64 encoded data representative of the markup language information.

11. A method for processing of markup language information comprising:
   receiving markup language information at a first data processor for identifying a part of the markup language information for compression;
   assigning a label representative of the part to form compressed information representative of the mark up language information comprising the label;
   sending the compressed information to a second data processor in communication with the first data processor;
   decompressing the compressed information in the second data processor;
   identifying the label; and
   associating the label with the part of markup language information.

12. A method of claim 11 further comprising storing in a data value database the label representative of a predetermined part of markup language information.

13. A method of claim 11 wherein the markup language information is extensible markup language (XML)

14. A method of claim 11 wherein the compressed information is textual string data, and the method further comprising embedding the label in a header comment field of the textual string data.

15. A method of claim 11 wherein the compressed information is base64 encoded data representative of the markup language information.

16. A method of claim 11 wherein the label is a tag-length-value based data representation in binary data.

17. A computer program product having a computer readable medium having computer readable program code means embodied in the medium for processing of markup language information in computer program logic on the processor of a computer, the computer program product comprising:
   a computer readable program code means for receiving markup language information at a first data processor for identifying a part of the markup language information for compression;
   a computer readable program code means for assigning a label representative of the part to form compressed information representative of the mark up language information comprising the label;
   a computer readable program code means for sending the compressed information to a second data processor in communication with the first data processor;
   a computer readable program code means for decompressing the compressed information in the second data processor;
   a computer readable program code means for identifying the label; and
   a computer readable program code means for associating the label with the part of markup language information.

18. The system of claim 1, wherein at least one of the first data processor and the second data processor is embodied in tangible computer readable medium.

\* \* \* \* \*